(12) United States Patent
Yang

(10) Patent No.: US 8,094,448 B2
(45) Date of Patent: Jan. 10, 2012

(54) BATTERY COVER ASSEMBLY FOR ELECTRONIC DEVICE

(75) Inventor: Mu-Wen Yang, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 365 days.

(21) Appl. No.: 12/327,485

(22) Filed: Dec. 3, 2008

(65) Prior Publication Data

US 2009/0325046 A1 Dec. 31, 2009

(30) Foreign Application Priority Data

Jun. 26, 2008 (CN) .......................... 2008 1 0302335

(51) Int. Cl.
*H04M 1/00* (2006.01)
(52) U.S. Cl. ......... 361/679.58; 361/679.55; 361/679.56; 455/575.1
(58) Field of Classification Search .................. 361/600; 455/575.7; 429/96–100
See application file for complete search history.

(56) References Cited

U.S. PATENT DOCUMENTS

| 5,848,719 A * | 12/1998 | Goldenberg | 220/326 |
| 2007/0048599 A1* | 3/2007 | Choi | 429/97 |
| 2007/0224871 A1* | 9/2007 | Zhan et al. | 439/327 |

* cited by examiner

*Primary Examiner* — Patrick Ryan
*Assistant Examiner* — Wyatt McConnell
(74) *Attorney, Agent, or Firm* — Altis Law Group, Inc.

(57) ABSTRACT

A battery cover assembly (100) for use in a portable electronic device, comprises a main body (30), a battery cover (10), and a elastic member (20). The battery cover (10) includes a plurality of latching portions (122). The elastic member (20) is mounted in the main body (30), and includes a body section (24) and a resisting section (28) extending from the body section (24). The latching portions (122) engages through openings in the body section (24) and are elastically resisted by the resisting portion (28) to releasably latch the battery cover (10) to the main body (30). When detaching the battery cover (10) from the main body (30), the resisting section (28 is elastically biased by the latching portions (122) to accumulate elastic force, the latching portions (122) is pushed away from the body section (24) under the elastic force of the resisting section (28).

18 Claims, 6 Drawing Sheets

BATTERY COVER ASSEMBLY FOR ELECTRONIC DEVICE

BACKGROUND

1. Field of the Invention

The present invention generally relates to battery cover assemblies, and particularly to battery cover assemblies used in electronic devices.

2. Description of Related Art

Batteries are widely used in portable electronic devices, such as personal digital assistants (PDAs), cellular phones and, etc. A latch structure is typically used with a battery cover to secure the battery within the electronic device. However, the battery cover can be damaged during disassembly.

Therefore, there is a room for improvement within the art.

BRIEF DESCRIPTION OF THE DRAWINGS

Many aspects of the exemplary battery cover assembly for electronic device can be better understood with reference to the following drawings. These drawings are not necessarily drawn to scale, the emphasis instead being placed upon clearly illustrating the principles of the exemplary battery cover assembly and portable electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Figure 1:
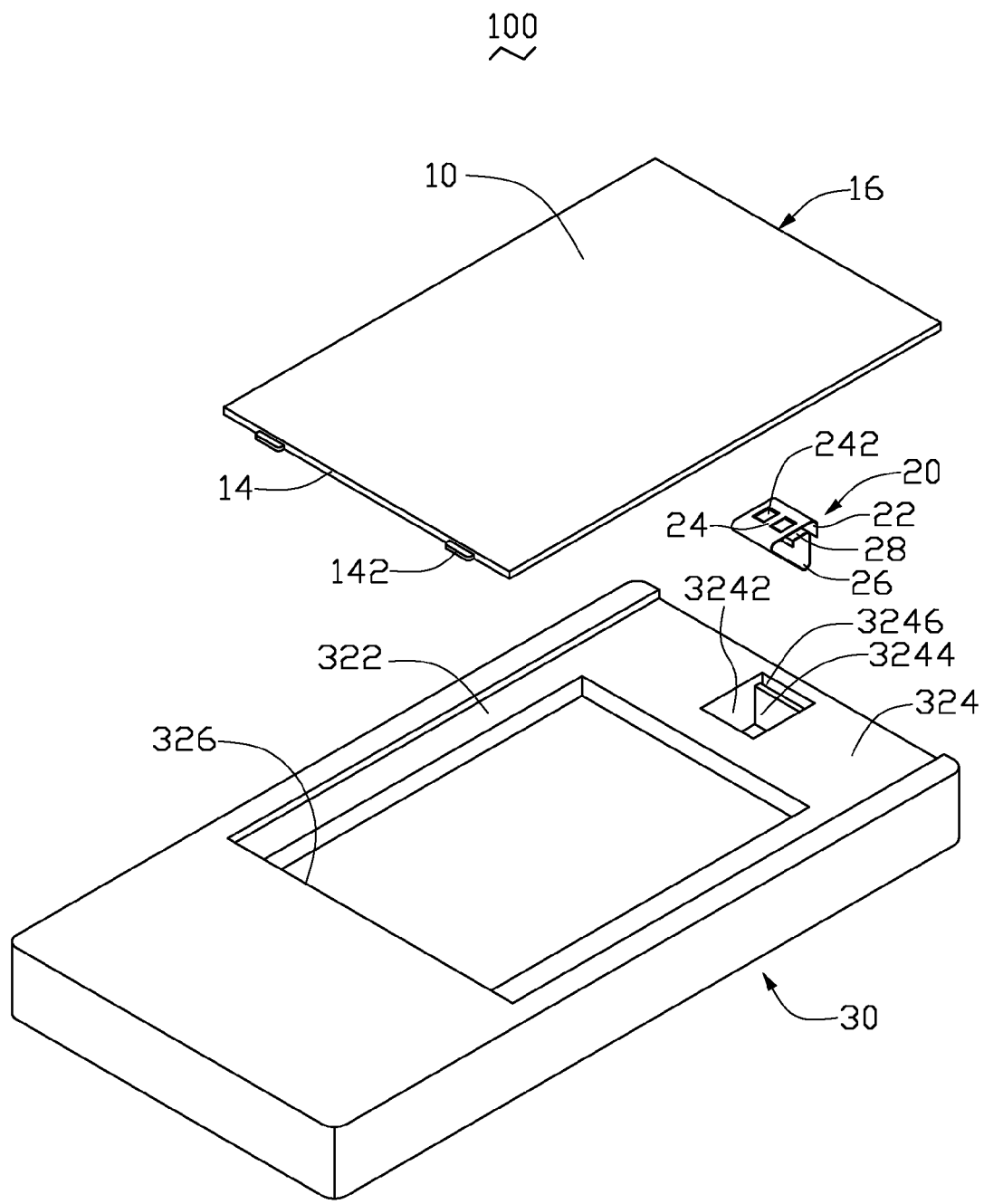
FIG. 1 is an exploded, isometric view of a battery cover assembly according to an exemplary embodiment.

FIG. 1 shows a battery cover assembly 100 including a battery cover 10, an elastic member 20, and a main body 30. The elastic member 20 secures the battery cover 10 onto the main body 30 (FIG. 6).

Figure 2:
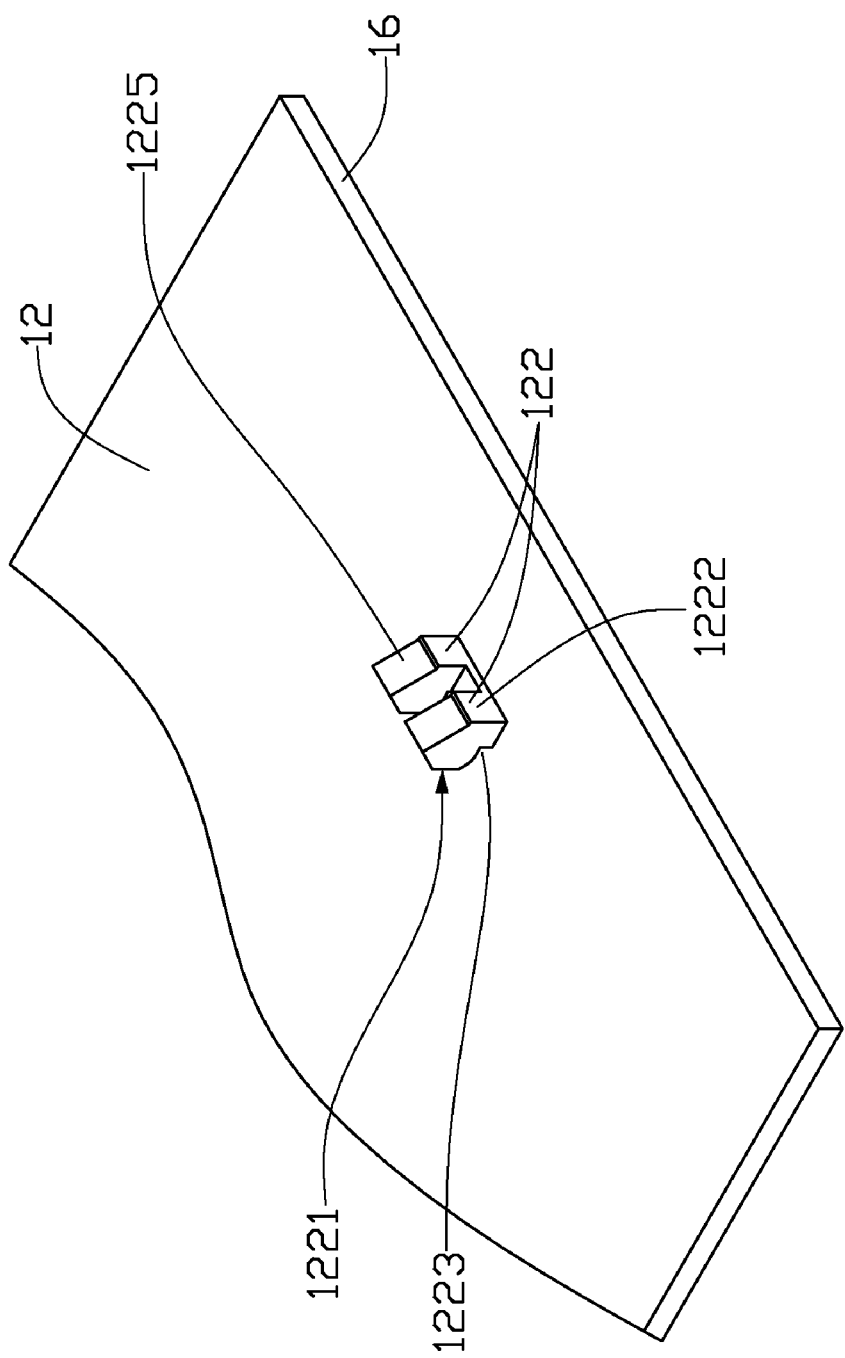
FIG. 2 is a partially enlarged view of a battery cover shown in FIG. 1 viewed from another angle.
Figure 3:
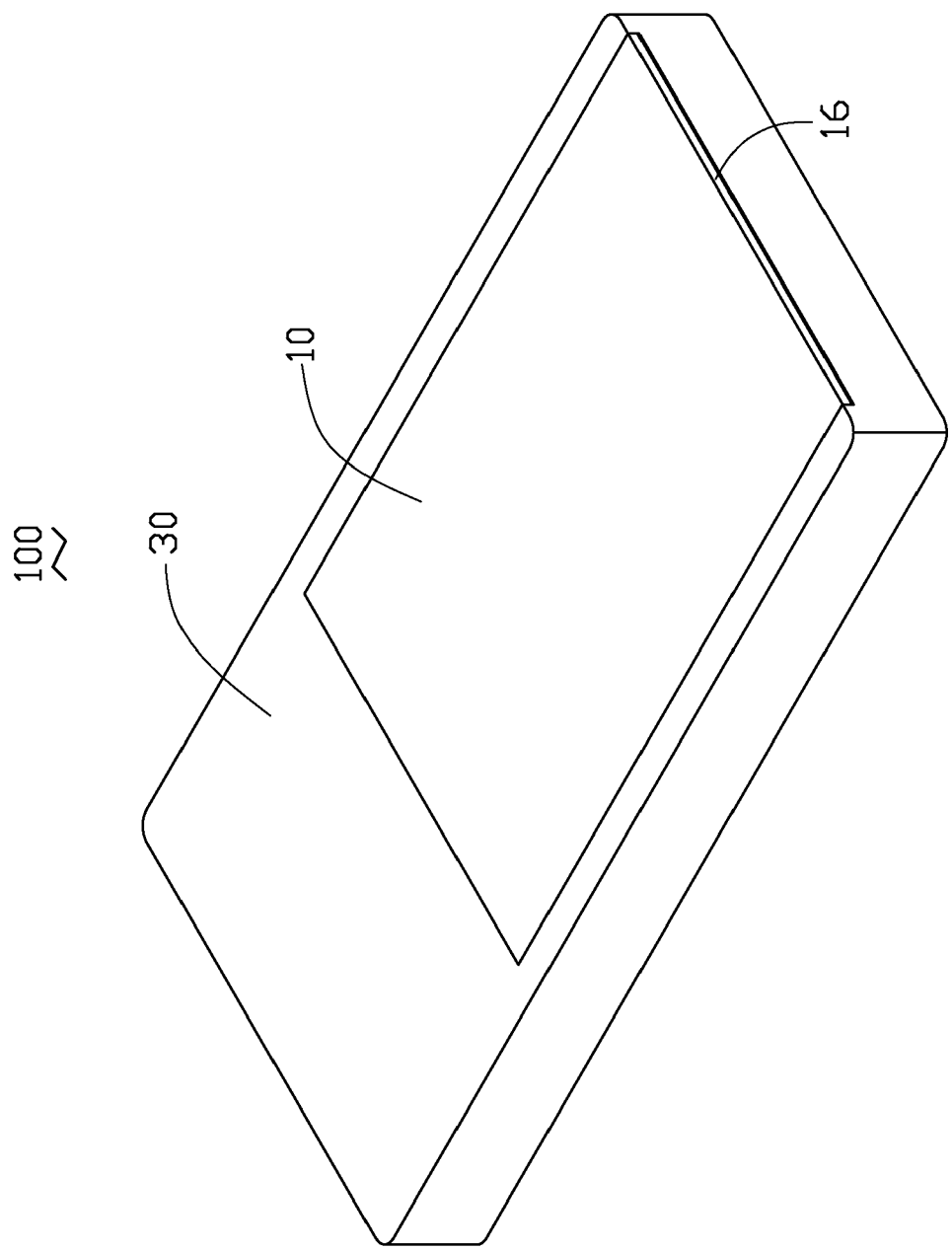
FIG. 3 is an assembled view of the battery cover assembly shown in FIG. 1.

Referring to FIGS. 1 and 2, the battery cover 10 is substantially rectangular and includes a first surface 12 facing the main body 30, a first end 14, and an opposite second end 16. The first surface 12 has latching portions 122 protruding outwardly from the first surface and toward the housing 30, adjacent to the second end 16. The battery cover 10 has two securing portions 142 protruding from the first end 14.

Figure 5:
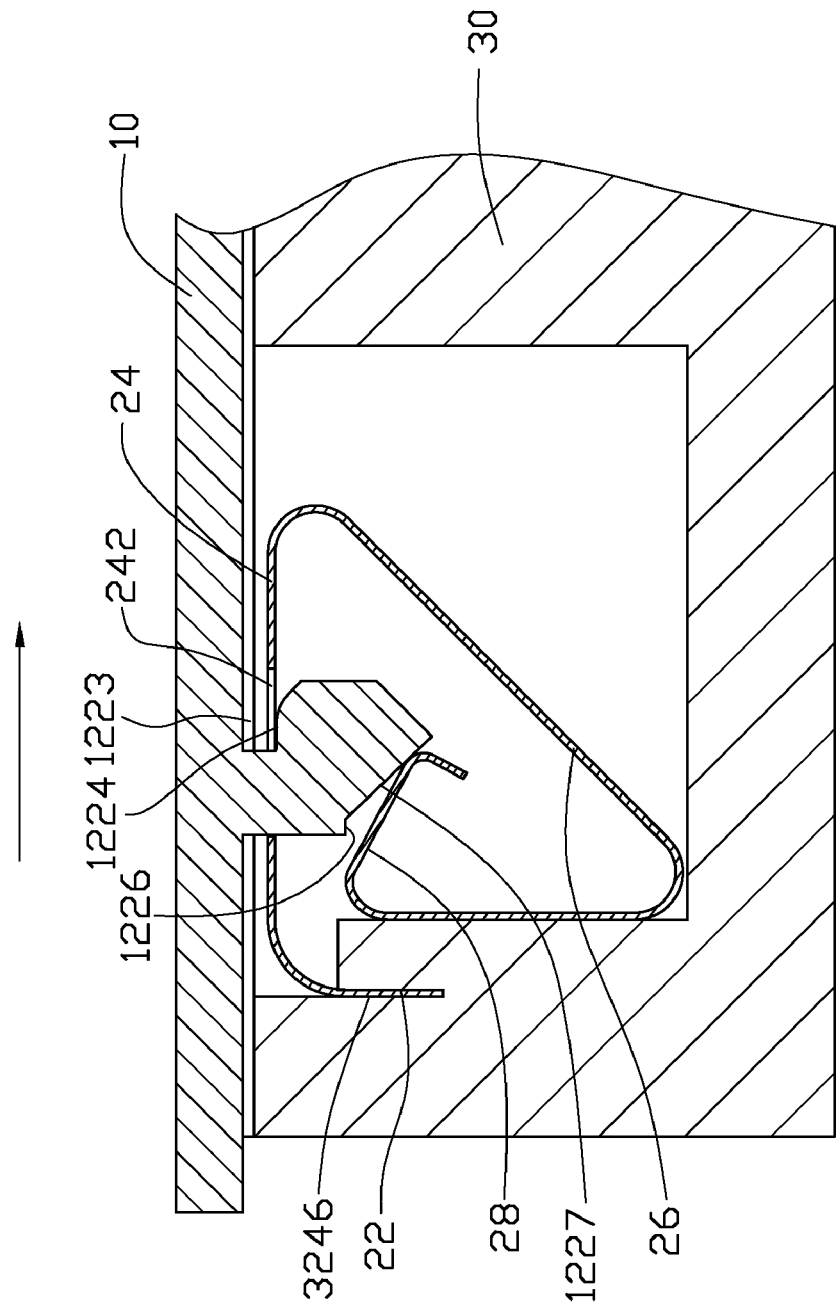
FIG. 5 is a partial and enlarged view of the battery cover assembly shown in FIG. 4.

Referring to FIGS. 1, 2 and 5, each latching portion 122 includes a first sidewall 1221 facing the first end 14 and a second sidewall 1222 facing the second end 16. The first sidewall 1221 defines a latching gap 1223 between the latching portion 122 and the first surface 12, thus forming a latching wall 1224 of the latching portion 122 parallel to the first surface 12. The second sidewall 1222 defines a trapezoidal notch 1225, thus forming a resisting wall 1226 of the latching portion 122 parallel to the first surface 12, and a wedge wall 1227 of the latching portion 122 connecting with the resisting wall 1226.

Figure 6:
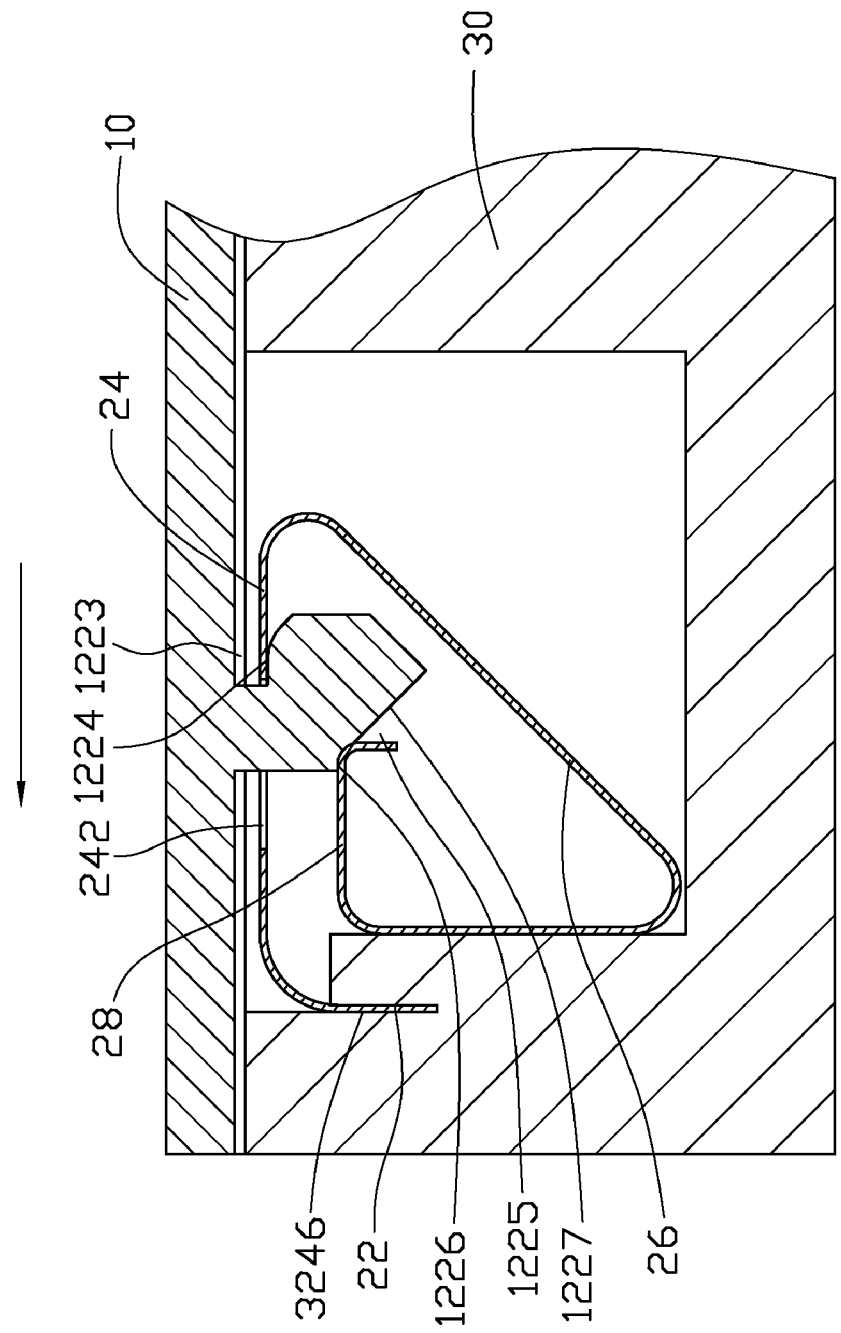
FIG. 6 is similar to FIG. 5 but shows the battery cover assembly at an assembled state.

Referring to FIGS. 1 and 6, the elastic member 20 is substantially a sheet member, and includes a body section 24, a retaining section 22 extending perpendicularly from one end of the body section 24, a V-shaped connecting section 26 extending from the other end of the body section 24, and a resisting section 28 extending from a distal end of the connecting section 26. The body section 24 has two openings 242 for corresponding to the latching portions 122. The retaining section 22 is configured for attaching the elastic member to the main body. The connecting section 26 are located one side of the body section 24 same as the retaining section 22. The resisting section 28 is elastic and substantially parallel with the body section 24. The resisting section 28 is located between the body section 24 and the connecting section 26.

Referring to FIGS. 1 and 6, the main body 30 is substantially rectangular, and defines a cavity 322 for accommodating a battery (not shown) and the battery cover 10. The cavity 322 has a first bottom wall 324 and a third sidewall 326 (also shown in FIG. 4). The first bottom wall 324 defines a recess 3242 corresponding to the elastic member 20, thus forming a fourth sidewall 3244 in the recess 3242. The fourth sidewall 3244 vertically defines a trough 3246 (clearly in FIG. 5) for securing the retaining portion 22. The third sidewall 326 defines two slots 3262 (shown in FIG. 4) for latching with the securing portions 142.

Figure 4:
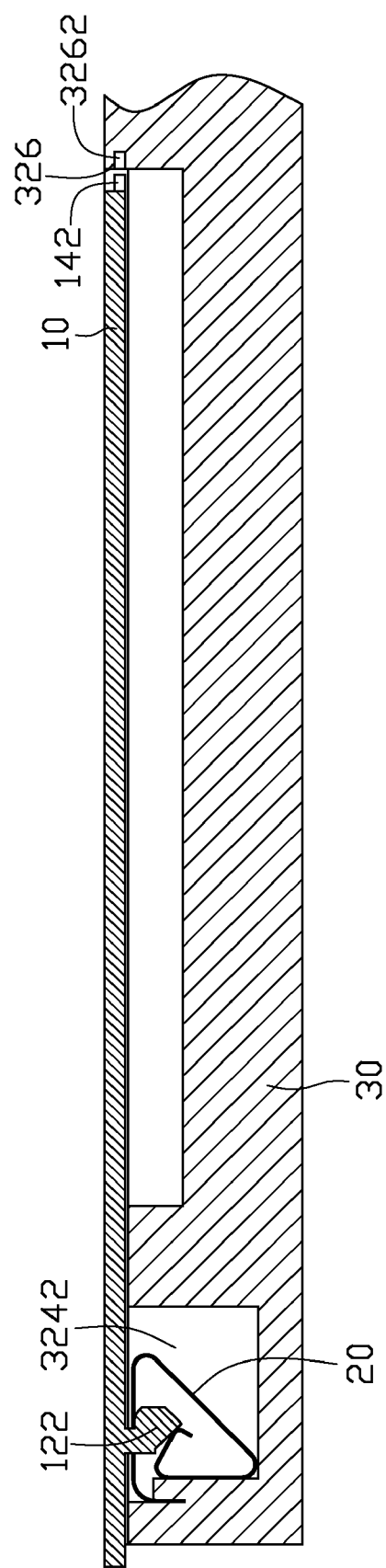
FIG. 4 is a cross section view of the battery cover assembly in FIG. 1 during assembly latching portion.

Referring to FIGS. 4 through 6, to assemble the battery cover assembly 100, the elastic member 20 is inserted and secured (e.g., by hot melting) in the trough 3246, during this stage, the body section 24, the connecting section 26, and the resisting section 28 are secured within the recess 3242. Then, the latching portions 122 are aligned and latched through the openings 242 and bias the resisting section 28 until the latching wall 1224 pass through the openings 242. The resisting section 28 biases against the wedge wall 1227. The securing portions 142 align with the slots 3262, and the battery cover 10 can move along the direction of the arrow in FIG. 5 as the resisting section 28 resists against the wedge wall 1227. When the securing portions 142 are latched into the slots 3262 and the body section 24 is secured within the latching gap 1223, the resisting section 28 resists the resisting wall 1226 and the wedge wall 1227. Thus, the battery cover 10 is secured to the main body 30.

To detach the battery cover 10 from the main body 30, the battery cover 10 is pushed along the direction designated by arrow in FIG. 6. As such, the wedge wall 1227 reversely biases the resisting section 28 relative to the main body 30. The latching portions 122 can disengage from the openings 242 when the latching walls 1224 reach the openings 242. The battery cover 10 can be detached from the main body 30 simply by raising the latching portions 122 out of the openings 242. Accordingly, the biased resisting section 28 returns by releasing the biasing of the wedge wall 1227.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover assembly used in a portable electronic device, comprising:
   a main body;
   a battery cover including a plurality of latching portions; and an elastic member mounted in the main body, and including a body section, a connecting section extending from the body section, and a resisting section extending from the connecting section, the body section defining a plurality of openings aligned with the resisting section, the latching portions passing through the openings and being elastically resisted by the resisting section to latch in the openings so the battery cover is latched to main body;

when detaching the battery cover from the main body, the resisting section is elastically biased and accumulates an elastic force by the latching portions, the latching portions then being pushed to disengage from the openings by the elastic force of the resisting section.

2. The battery cover assembly as claimed in claim 1, wherein the battery cover includes a first end, the battery cover has a plurality of securing portions protruding from the first end, the main body has a plurality of slots corresponding to the securing portions, the securing portions latching into the slots.

3. The battery cover assembly as claimed in claim 2, wherein the battery cover further includes a second end opposite to the first end, the latching portions adjacent to the second end.

4. The battery cover assembly as claimed in claim 3, wherein each latching portion includes a first sidewall facing the first end and a second sidewall facing the second end, the first sidewall latches with the body section, the resisting section biases the second sidewall.

5. The battery cover assembly as claimed in claim 4, wherein the first sidewall defines a latching gap for latching the body section therein.

6. The battery cover assembly as claimed in claim 4, wherein the second sidewall includes a resisting wall and a wedge wall intersecting with the resisting wall.

7. The battery cover assembly as claimed in claim 6, wherein when detaching the battery cover, the wedge wall biases the resisting section to provide the elastic force for pushing the latching portion away from the main body.

8. The battery cover assembly as claimed in claim 1, wherein the elastic member is fixed to the main body and further includes a retaining section extending perpendicularly from one end of the body section.

9. The battery cover assembly as claimed in claim 8, wherein the main body defines a trough corresponding to the elastic member, and a sidewall defines a recess for receiving the retaining section.

10. The battery cover assembly as claimed in claim 9, wherein the connecting section extends from another end of the body section opposite to the retaining section and located on one side of the body section same as the retaining section.

11. The battery cover assembly as claimed in claim 10, wherein the resisting section is an elastic plate substantially parallel with the body section and located between the body section and the connecting section.

12. A battery cover assembly for use in a portable electronic device, comprising:

a main body;

a battery cover including a plurality of latching portions; and an elastic member mounted on the main body, and including a body section and a resilient part, the body section defining a plurality of openings aligned with the resilient part;

Wherein when the battery cover is latched to the main body, the latching portions pass through the openings, the resilient part is elastically biased and accumulates an elastic force by the latching portions, the latching portions then being pushed to latch with the openings by the elastic force of the resilient part.

13. The battery cover assembly as claimed in claim 12, wherein the battery cover includes a first end, the battery cover has a plurality of securing portions protruding from the first end, the main body has a plurality of slots corresponding to the securing portions, the securing portions latching into the slots.

14. The battery cover assembly as claimed in claim 13, wherein the battery cover further includes a second end opposite to the first end, the latching portions adjacent to the second end.

15. The battery cover assembly as claimed in claim 14, wherein each latching portion includes a first sidewall facing the first end and a second sidewall facing the second end, the first sidewall latches with the body section, the resisting section biases the second sidewall.

16. The battery cover assembly as claimed in claim 15, wherein the first sidewall defines a latching gap for latching the body section therein.

17. The battery cover assembly as claimed in claim 16, wherein the second sidewall defines a trapezoidal notch such that a resisting wall parallel with the battery cover and a wedge wall intersecting with the resisting wall are defined in the notch.

18. The battery cover assembly as claimed in claim 17, wherein when detaching the battery cover, the wedge wall biases the resisting section to provide the elastic force for pushing the latching portion away from the main body.

\* \* \* \* \*